United States Patent [19]
Lovell

[11] Patent Number: 5,180,900
[45] Date of Patent: Jan. 19, 1993

[54] ELECTRICAL RESISTANCE ELEMENT WITH HEAT-SENSITIVE DISCONNECT CAPABILITY

[75] Inventor: Walter C. Lovell, Wilbraham, Mass.

[73] Assignee: Tapeswitch Corporation of America, Farmingdale, N.Y.

[21] Appl. No.: 685,827

[22] Filed: Apr. 15, 1991

[51] Int. Cl.$^5$ .............................................. H05B 1/02
[52] U.S. Cl. .................................. 219/517; 219/549; 219/553; 338/212; 337/415
[58] Field of Search ................ 337/414, 415; 338/210, 338/212; 219/546, 553, 549, 528, 548, 517, 510

[56] References Cited

U.S. PATENT DOCUMENTS

| | | | |
|---|---|---|---|
| 3,268,846 | 8/1966 | Morey | 338/212 |
| 3,627,981 | 12/1971 | Kuhn | 219/212 |
| 3,683,361 | 8/1972 | Salzwedel | 338/322 |
| 3,757,087 | 9/1973 | Bernard | 219/549 |
| 4,543,474 | 9/1985 | Horsma et al. | 219/553 |
| 4,679,107 | 7/1987 | Imakoshi et al. | 338/32 R |
| 4,758,815 | 7/1988 | Lovell | 338/212 |
| 4,823,106 | 4/1989 | Lovell | 338/212 |

FOREIGN PATENT DOCUMENTS

| | | |
|---|---|---|
| 2346206 | 3/1975 | Fed. Rep. of Germany . |
| 2023452 | 8/1970 | France . |
| 2357040 | 1/1978 | France . |
| 425927 | 6/1967 | Switzerland . |
| 1363603 | 8/1974 | United Kingdom . |
| 2065430 | 6/1981 | United Kingdom . |
| 2077508 | 12/1981 | United Kingdom . |

Primary Examiner—Bruce A. Reynolds
Assistant Examiner—Michael D. Switzer
Attorney, Agent, or Firm—Hoffmann & Baron

[57] ABSTRACT

An electrical resistance heating element includes a pair of spaced apart electrical conductors, and a strip of resistive material disposed between the conductors and extending along their lengths. A strip of heat-sensitive, electrically conductive material is also disposed between the conductors and also extends along their lengths. The strips of resistive material and heat-sensitive, electrically conductive material together provide an electrical path between the conductors widthwise along their lengths. The heat-sensitive strip interrupts an electrical path between the conductors and widthwise through the resistive material strip only over portions of the resistive material strip which attain a predetermined temperature.

15 Claims, 4 Drawing Sheets

ELECTRICAL RESISTANCE ELEMENT WITH HEAT-SENSITIVE DISCONNECT CAPABILITY

BACKGROUND OF THE INVENTION

1. Field of the Invention

The present invention relates to electrical resistance elements, and more particularly relates to an electrical resistance element having a heat-sensitive disconnect capability.

2. Description of the Prior Art

Conventional electrically energized, elongated heating elements currently on the market and commonly referred to as heating cords generally utilize high resistance metallic conductors, such as nichrome wires, embedded within a plastic substrate, whereby the conductors are coupled in series in order to form a complete electrical path through the element and thus generate heat. A common use for such elongated heating elements is to wrap the element around a water pipe to prevent the pipe from freezing.

One of the major problems with such commercially available heating elements is that they may produce "hot spots", for example, if they are double wrapped such that a portion of the element is wrapped over another portion. The hot spots occur at the double wrapped portions of the elongated heating element. The element may overheat and cause a fire. Usually, such resistance elements are sold with warning labels advising the consumer not to double wrap the element.

Another problem with many conventional elongated heating elements is that they have a fixed length. Those conventional elements that may be cut to a desired length require that the two nichrome wires be reconnected at the ends that are cut to form a closed circuit. This requirement is not only an annoyance but also could be dangerous when 115 volts is employed in energizing the element.

U.S. Pat. Nos. 4,758,815 and 4,823,106, each of which issued to the present inventor, Walter Lovell, the disclosures of which are incorporated herein by reference, disclose a heat generating, electrical resistance tape element. The resistance tape element basically includes a pair of flat, parallel, spaced apart ribbon conductors and an elongated strip of commercially available magnetic recording tape which at least slightly overlaps and contacts the ribbon conductors. The electrical conductors and magnetic recording tape are laminated between top and bottom plastic covering sheets. The laminated heating tape disclosed in the Lovell U.S. patents mentioned above has many advantages over conventional heating elements including its ability to be rolled up tightly for shipment, its capability of being manufactured inexpensively and its ability to be cut to a desired length without the need to connect the terminal portions together prior to use.

OBJECTS AND SUMMARY OF THE INVENTION

It is an object of the present invention to provide an electrical resistance element with a heat-sensitive disconnect capability.

It is a further object of the present invention to provide an electrical resistance element in the form of a heating tape which is continuous and may be cut to any desired length without requiring an electrical connection at the cut portion.

It is another object of the present invention to provide an electrical resistance element in the form of a continuous tape, which element will continue to provide heat over its entire length except for specific portions where a hot spot occurs.

It is another object of the present invention to provide an area heater having a heat-sensitive disconnect capability.

It is yet another object of the present invention to provide an electrical resistance element which overcomes the disadvantages of known electrical resistance elements.

In one form of the present invention, an electrical resistance heating element includes a pair of spaced apart electrical conductors, and a strip of resistive material, which becomes warm when current passes through it, disposed between the conductors and extending along their lengths. Another strip of a heat-sensitive, electrically conductive material is also disposed between the conductors and extends along their lengths. The strips of resistive material and heat-sensitive, electrically conductive material together provide an electrical path transversely between the conductors along their lengths. The heat-sensitive strip will interrupt an electrical path between the conductors only over portions of the resistive material strip which attain a predetermined temperature.

In one preferred form of the invention, the strip of resistive material contacts one conductor along its length, and the strip of heat-sensitive conductive material contacts the strip of resistive material and the other conductor along their lengths to provide an electrical path between the conductors and through the resistive material. The heat-sensitive, electrically conductive material, in one form of the invention, may shrink in width wherever a "hot spot" occurs along the length of the resistive material. At those portions of the resistive material strip where the heat-sensitive material has shrunk in width, the heat-sensitive material no longer contacts either the resistive heating material or one of the conductors so that no current will flow transversely through the resistive heating material over those over-temperature portions.

In another form of the invention, the heat-sensitive material retains its original width at elevated temperatures but "bubbles" or forms discontinuous droplets at the hot spot areas to interrupt the flow of current through the resistive material at those areas.

Preferred forms of the electrical resistance element, as well as other embodiments, objects, features and advantages of this invention, will be apparent from the following detailed description of illustrative embodiments thereof, which is to be read in conjunction with the accompanying drawings.

DETAILED DESCRIPTION OF THE PREFERRED EMBODIMENTS

Figure 1:
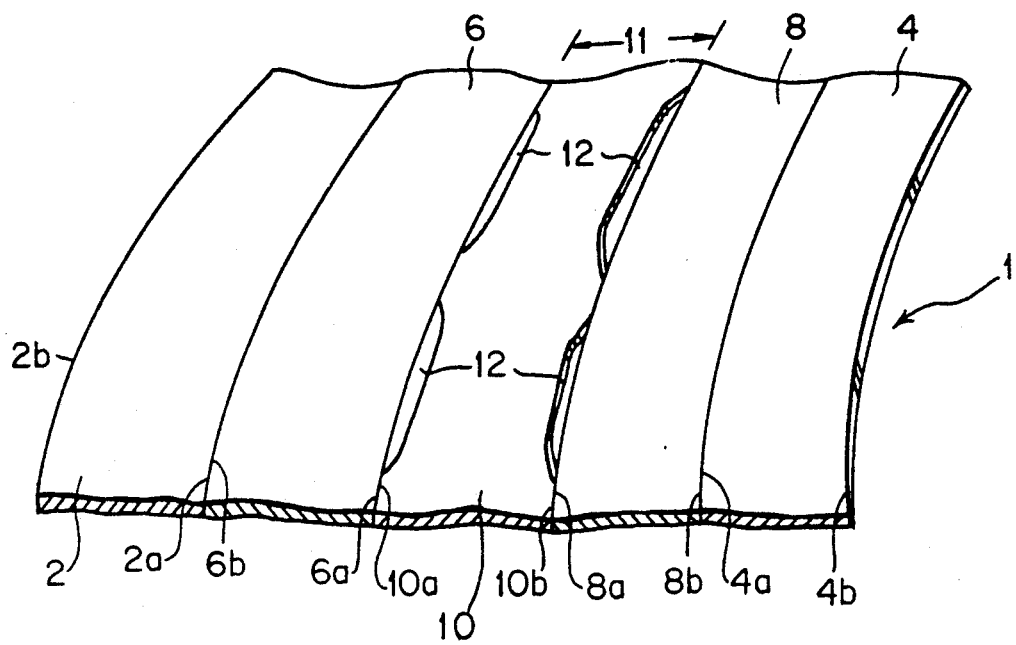
FIG. 1 is a top perspective view of a portion of an electrical resistance heating element formed in accordance with one form of the present invention.

Referring now to FIG. 1 of the drawings, it is seen that an electrical resistance element 1 for use in heating pipes, for example, and constructed in accordance with a first embodiment of the present invention basically includes first and second electrical conductors 2, 4, in spaced relationship from each other. Preferably, the conductors 2, 4 are flat, parallel, elongated ribbon conductors. The resistance element further includes first and second elongated strips of resistive material 6,8 which became warm when sufficient current is passed through them. In one preferred mode, and as disclosed in U.S. Pat. Nos. 4,758,815 and 4,823,106 mentioned previously, the disclosures of which are incorporated herein by reference, the first and second resistive material strips 6,8 may be formed from magnetic recording tape and will be referred to hereinafter as first and second magnetic recording tape portions. The electrical resistance heating element also includes an elongated strip of heat-sensitive, electrically conductive material 10.

The first electrical conductor 2 preferably includes inner and outer edges 2a, 2b. Similarly, the second electrical conductor 4 includes inner and outer edges 4a, 4b. The first and second electrical conductors 2, 4 are preferably in spaced relationship from each other and define a specified conductor gap width between their inner edges 2a, 4a.

The first magnetic recording tape portion 6 also preferably includes inner and outer edges 6a, 6b. The inner edge 2a of the first electrical conductor 2 electrically communicates with the outer edge 6b of the first magnetic recording tape portion 6.

The second magnetic recording tape portion 8 preferably also includes inner and outer edges 8a, 8b. The first and second magnetic recording tape portions 6, 8 are preferably in spaced relationship from each other and define a specified tape gap width between their inner edges 6a, 8a.

The heat-sensitive strip 10 preferably includes opposite first and second edges 10a, 10b, defining the outer edges of the heat-sensitive strip. Further, the heat-sensitive portion has at least the specified tape gap width. The first edge 10a of the heat-sensitive portion 10 is in electrical communication with the inner edge 6a of the first magnetic tape portion 6. The second edge 10b of the heat-sensitive portion 10 is in electrical communication with the inner edge 8a of the second magnetic recording tape 8.

The inner edge 4a of the second conductor 4 is in electrical communication with the outer edge 8b of the second magnetic recording tape portion 8. The first and second conductors 2, 4, the first and second magnetic tape portions 6, 8, and the heat-sensitive portion 10 are in electrical communication with each other, thereby allowing electrical current to flow through them widthwise along the entire length of the resistance heating element.

The current flow through the heating element 1 raises the temperature of the magnetic recording tape portions 6, 8, thereby generating the desired heat. The heat-sensitive portion 10 substantially retains its width 11 at the normal operating temperature of the resistance heating element so that an electrical path is provided transversely through the magnetic recording tape portions 6, 8 along the entire length of the resistance heating element. However, the heat-sensitive portion 10 reduces its width 11 at a predetermined higher temperature so that, wherever a "hot spot" occurs over the length of the resistance heating element, the heat-sensitive strip will shrink in width at those areas and no longer make contact with at least one of the first and second tape portions 6, 8 only at those hot spots in the element where the heat-sensitive strip has shrunk. Thus, current no longer passes through those areas where the magnetic recording tape has overheated, although current continues to pass through the rest of the magnetic recording tape portions 6, 8 which has not overheated and is operating at a normal temperature.

The electrical resistance element 1 of a first embodiment as shown in FIG. 1 can be wrapped around a pipe to heat the pipe to a desired temperature. When wrapping the element 1 around a pipe, for example, it is possible that some sections of the resistance element will overlap each other, resulting in a "hot spot". The heat-sensitive strip will cause a discontinuity in the electrical path between the conductors and through the magnetic recording tape portions only at the "hot spot" in the element, thereby reducing the temperature over the portion of the resistance element which overheated.

Figure 2:
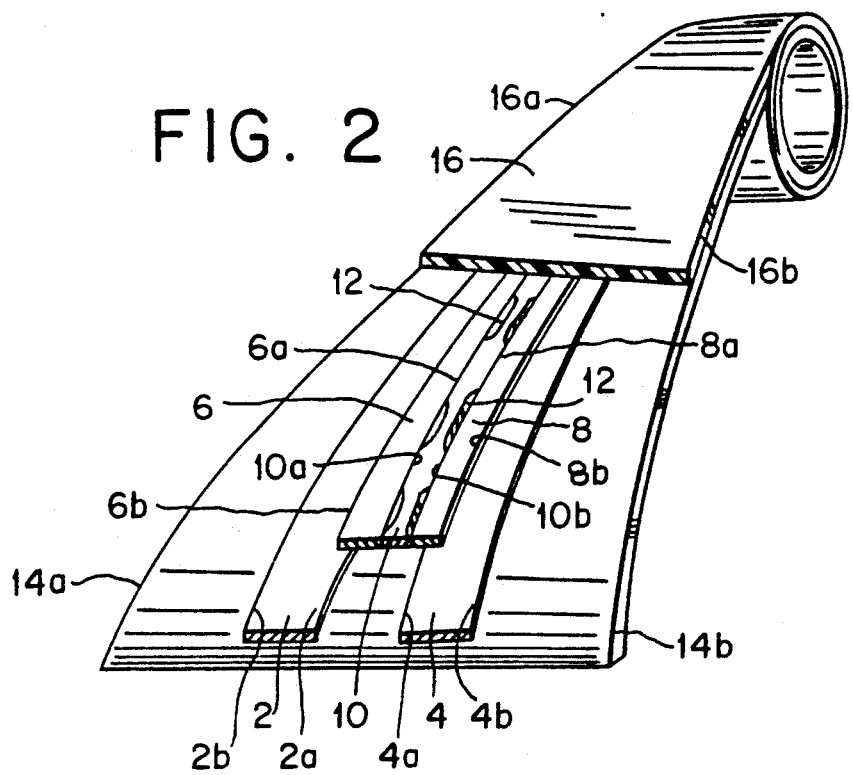
FIG. 2 is a top perspective view of a second embodiment of the electrical resistance element of the present invention.

A second embodiment of the electrical resistance element 1 previously described is shown in FIG. 2. The electrical resistance element 1 includes first and second conductors 2, 4, first and second magnetic tape portions 6, 8, and a heat-sensitive portion 10, as in the previous embodiment shown in FIG. 1. However, in the embodiment shown in FIG. 2, the first and second magnetic tape portions 6, 8 have a partially overlapping relationship with the first and second conductors 2, 4. More specifically, the outer edges 6b, 8b of the first and second magnetic recording tape portions 6, 8, and the inner edges 2a, 4a of the first and second conductors 2, 4 have portions in overlapping relationship in a specified overlap area.

It is desirable to at least partially overlap the magnetic recording tape portions 6, 8 and the conductors 2, 4 for a number of reasons. First, overlapping allows the electrical components of the resistance element to be laminated together in a protective covering, as will be described in greater detail. Second, the heat output (and current passing widthwise through the magnetic recording tape portions 6, 8) of the resistance element can be controlled. The edge portions of the magnetic recording tape strips which are overlapped with the conductors 2, 4 are effectively shorted out, and current passes through substantially only the non-overlapped width of the magnetic recording tape strips 6, 8, and only the non-overlapped portions will generate heat. The disconnect capability of the resistance heating element will still be present as long as the heat-sensitive strip can shrink to a width such that at least one of its edges is no longer in electrical contact with the first or second magnetic recording tape portions 6, 8.

As mentioned previously, the electrical resistance element may include a protective covering. As shown in the embodiment of FIG. 2, a first non-conductive cover 14 and a second non-conductive cover 16 are provided for this purpose. The first and second conductors 2, 4, the first and second magnetic recording tape portions 6, 8, and the heat-sensitive portion 10 are sandwiched between the first and second covers 14, 16.

The outer edges 2b, 4b of the first and second conductors 2, 4 are positioned away from the outer edges 14a, 14b, 16a, 16b of the first and second covers 14, 16 to form margin portions enabling the first and second covers 14, 16 to be tightly laminated to each other within the margin portions. The first and second magnetic recording tape portions 6, 8, the first and second conductors 2, 4, and the heat-sensitive portion 10 are pressed firmly and thus laminated together between the first and second cover sheets 14, 16, in a similar manner to that described in the previously mentioned Lovell patents. Thus, the conductors 2, 4, the magnetic recording tape portions 6, 8, and the heat-sensitive portion 10 continually maintain firm contact with each other as the tape is wrapped or curled without the need for electrically conductive adhesives between the contacting portions of the resistance heating element.

Figure 3:
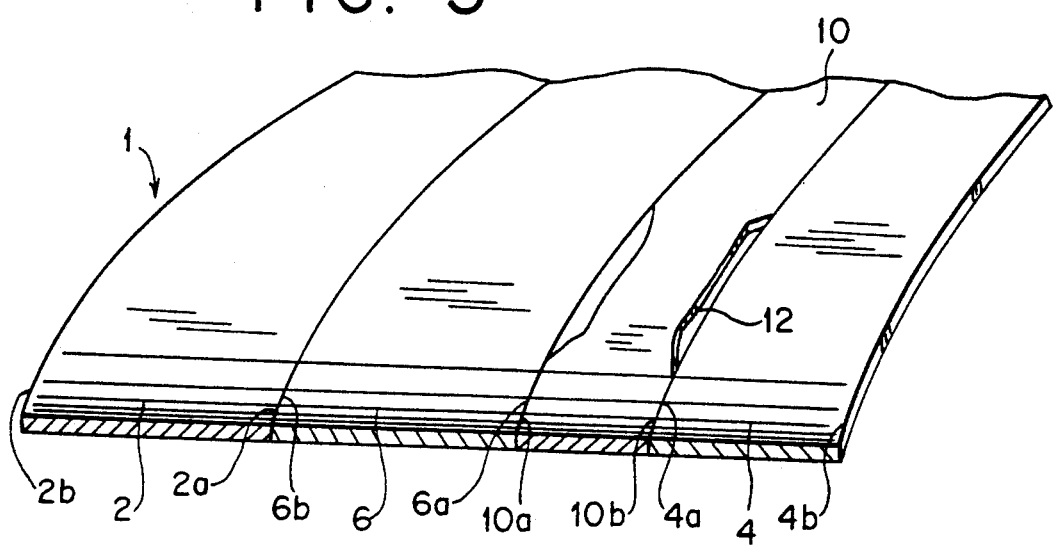
FIG. 3 is a top perspective view of a portion of a third embodiment of the electrical resistance element of the present invention.

A third embodiment of the electrical resistance element 1 previously described is shown in FIG. 3. The electrical resistance element 1 includes first and second conductors 2, 4, a heat-sensitive portion 10, and a magnetic tape portion 6, as in the previous embodiment shown in FIG. 1. However, in the embodiment shown in FIG. 3, only one magnetic tape portion 6 is included in the electrical resistance element 1. The inner edge 6a of the magnetic tape portion 6 is in electrical communication with the first edge 10a of the heat-sensitive portion 10. The first edge 10a of the heat-sensitive portion 10 electrically communicates with the inner edge 6a of the first magnetic recording tape portion 6. The second edge 10b of the heat-sensitive portion 10 electrically communicates with the inner edge 4a of the second electrical conductor 4. Thus, the heating element 1 is provided with one magnetic tape portion 6 for heating but operates in the same manner as the embodiments previously described.

Figure 4:
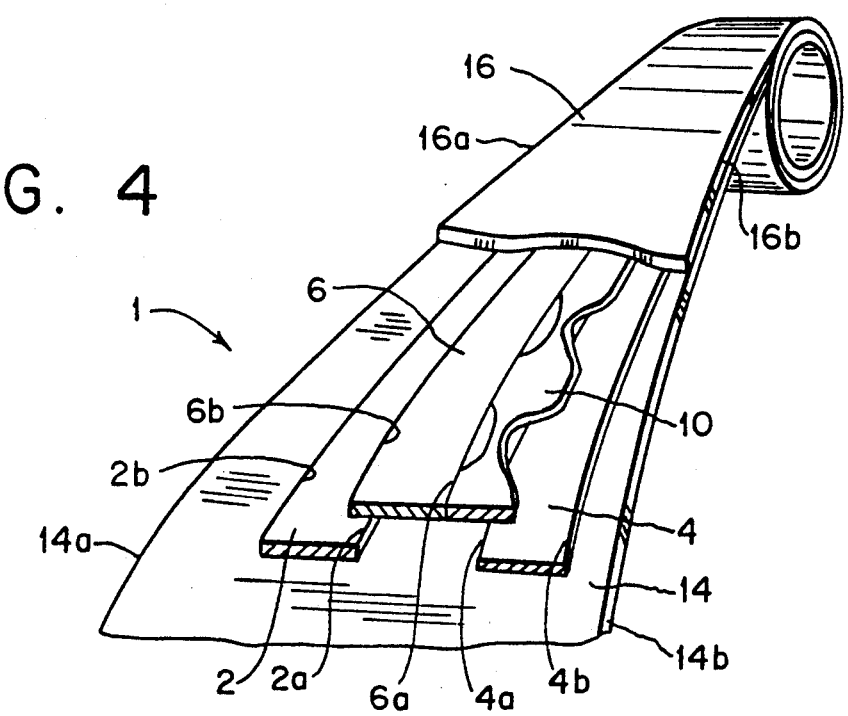
FIG. 4 is a top perspective view of a fourth embodiment of the electrical resistance element of the present invention.

A fourth embodiment of the electrical resistance element 1 previously described is shown in FIG. 4. The electrical resistance element 1 includes first and second conductors 2, 4, a heat-sensitive portion 10, and a magnetic tape portion 6, as in the previous embodiment shown in FIG. 1. Also, the electrical resistance element 1 includes a first non-conductive cover 14 and a second non-conductive cover 16, as in the previous embodiment shown in FIG. 2. The outer edges 2b, 4b of the first and second conductors 2, 4 are positioned away from the outer edges 14a, 14b, 16a, 16b of the first and second covers 14, 16 to form margin portions. The margin portions enable the first and second cover sheets 14, 16 to be tightly laminated to each other within the margin portions, as in the previous embodiment shown in FIG. 2. The first magnetic recording tape portion 6, the first and second conductors 2, 4, and the heat-sensitive portion, 10 are pressed firmly together between the first and second cover sheets 14, 16.

The embodiment shown in FIG. 4 includes only the first magnetic recording tape portion 6, and the second magnetic recording tape portion 8 is eliminated. The first magnetic tape portion 6 is in partially overlapping relationship with the first conductor 2. More specifically, the outer edge 6b of the first magnetic recording tape portion 6, and the inner edge 2a of the first conductor 2 have portions that are in overlapping relationship in a specified overlap area. Thus, one magnetic recording tape portion is used for heating, and the conductors 2, 4, the magnetic recording tape portion 6, and the heat-sensitive portion 10 are pressed between the covers 14, 16 to continuously maintain contact with each other during normal operation.

Figure 5A:
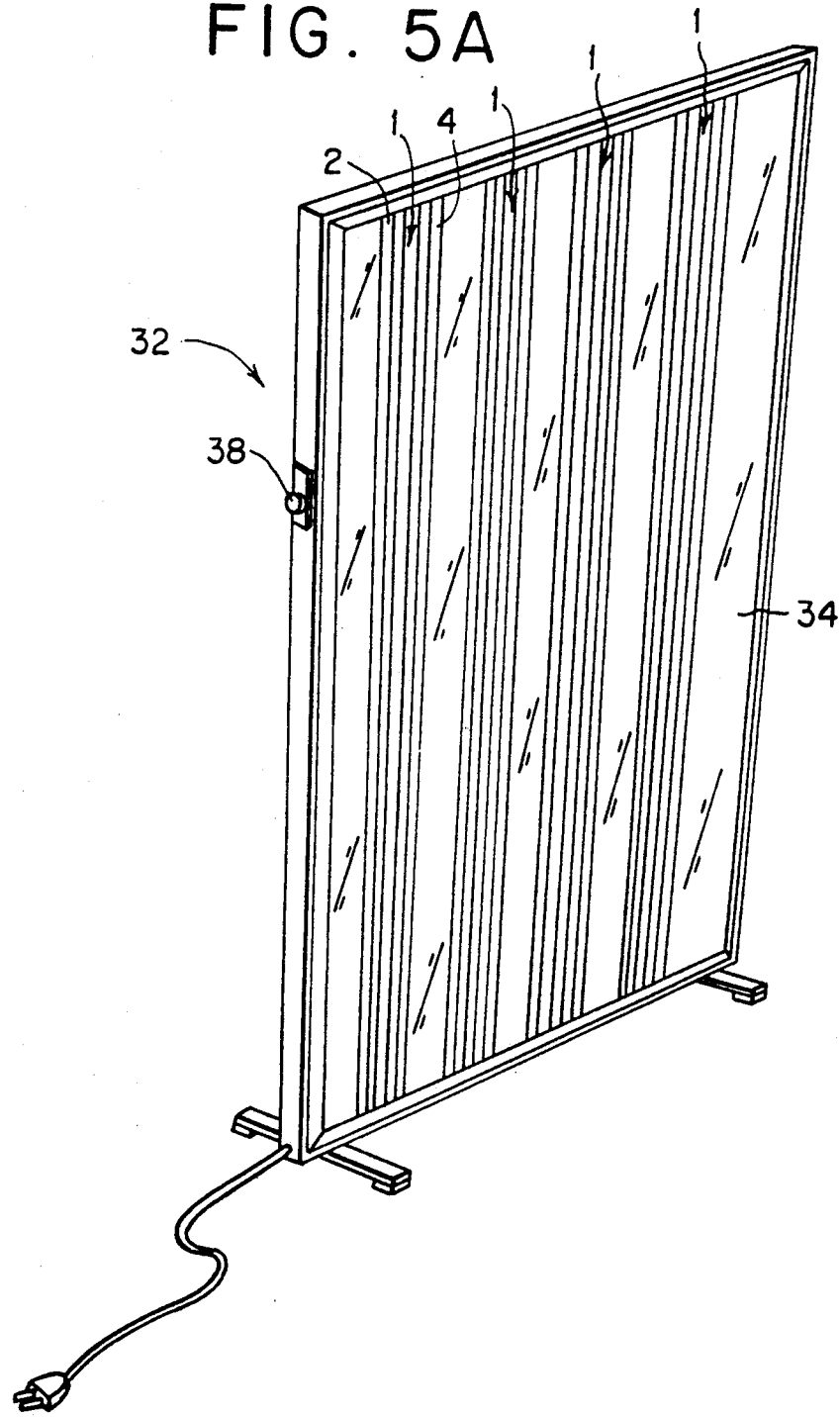
FIG. 5a is a perspective view of one form of an area heater formed in accordance with the present invention.
Figure 5B:
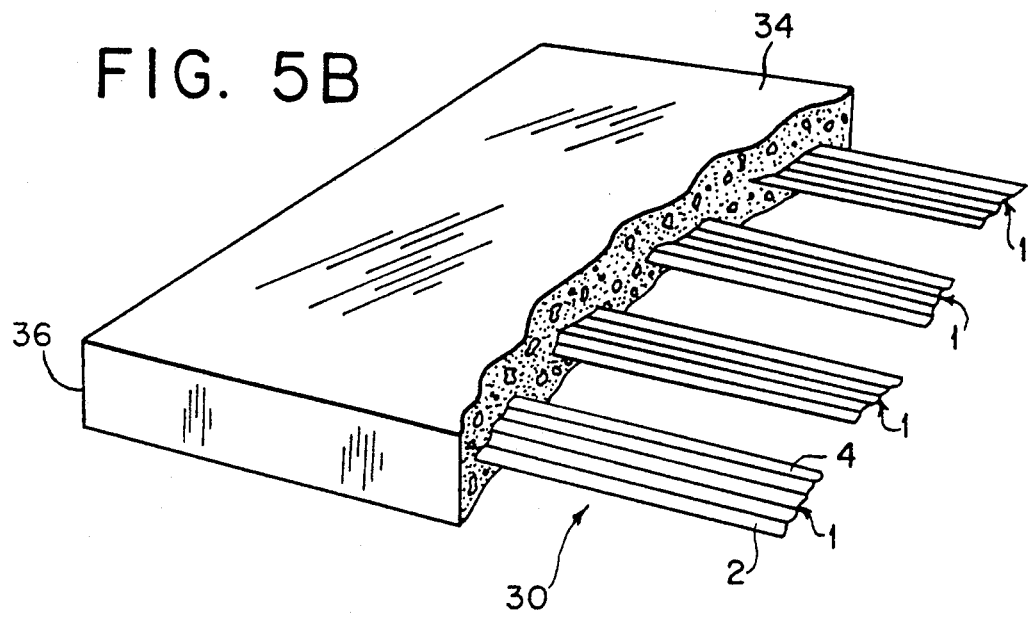
FIG. 5b is a partial perspective view of another form of an area heater formed in accordance with the present invention.

An area heater 30, 32 formed in accordance with the present invention, is shown in FIGS. 5a and 5b. The area heater is composed of a parallel arrangement of electrical resistance elements 1, each having the structure of one of the embodiments described previously and shown in FIGS. 1–4 or FIG. 6 which will be described. The first and second conductors 2, 4 of each resistance element of the arrangement may be respectively interconnected, and connected to a source of power. Thus, an area heater will have a planar, heat radiating surface 34 which will radiate heat evenly to a room, for example. If a "hot spot" develops on the planar, heat-radiating surface, the heat-sensitive strip in the resistance element situated at the hot spot will automatically stop the current flow transversely through the magnetic recording tape (or other resistive heating material) only at the hot spot. The area heater 30 may be incorporated into a wall or floor 36 of a room, as illustrated by FIG. 5b, or may be designed to be a free-standing room heater 32 with a heat controllable thermostat 38, as shown in FIG. 5a.

The heat-sensitive electrically conductive strip 10 has been described so far as being of the type that shrinks in width at a predetermined temperature. A suitable shrinkable film which may be used for this purpose is Part No. 142GA Fleetmark H. S. Silver, manufactured by Xebec Company of North Haven, Conn. This particular film is designed to shrink at approximately 158° F.

It is, however, envisioned to alternatively use a strip of conductive heat-sensitive material which retains its original width but forms bubbles or electrically discontinuous droplets 40 at elevated temperatures, thus interrupting the flow of current widthwise wherever a hot spot occurs on the resistance heating element. Such a heat-sensitive material may be used in any of the embodiments of the invention previously described, and is shown in FIG. 6 in one such embodiment.

Figure 6:
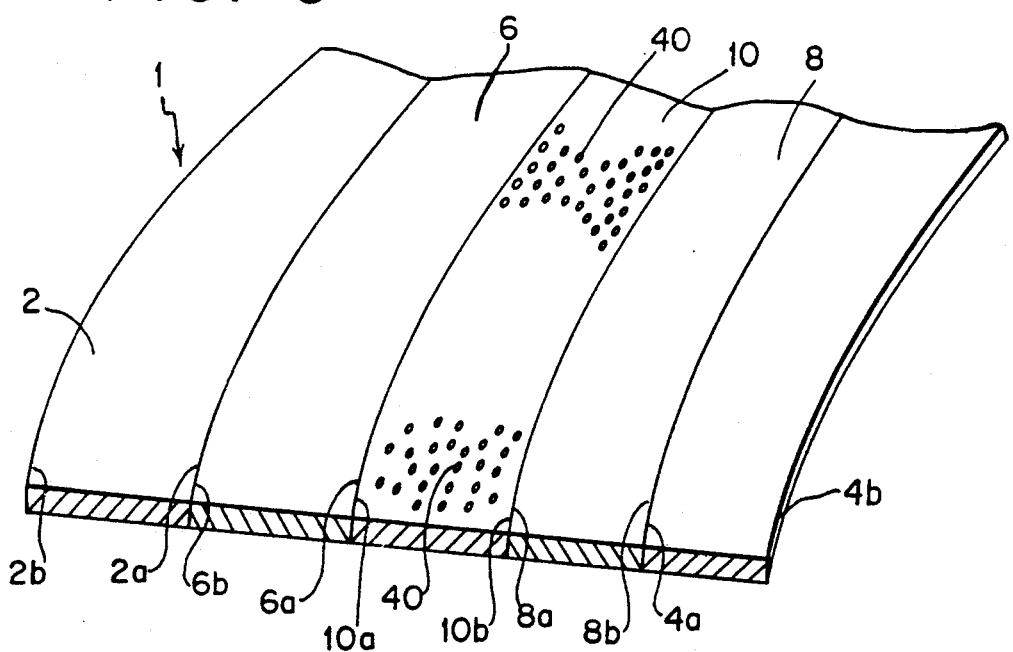
FIG. 6 is a top perspective view of a sixth embodiment of the electrical resistance element of the present invention.

As shown in FIG. 6, the resistance heating element 1 includes first and second conductors 2, 4, a heat-sensitive portion of the droplet or bubble type 10' and first and second resistance material strips such as magnetic tape portions 6, 8, arranged in the manner described previously with respect to FIG. 1. The heat-sensitive portion 10' provides an electrical path through the first and second magnetic tape portions along the entire length of the electrical resistance element 1 at normal operating temperatures.

Whenever a hot spot occurs, the electrically conductive film of the heat-sensitive portion 10' will form into discontinuous bubbles or droplets 40 at that hot spot, and disrupt the flow of current widthwise through the heat-sensitive strip as well as widthwise through the first and second magnetic recording tape portions 6, 8 only at that hot spot. The overheated portion of the electrical resistance element will, accordingly, cool, thus lessening the risk of fire.

Indium Corporation of America, located in Utica, N.Y., manufactures a suitable ribbon which may be used as heat-sensitive strip 10'. One ribbon it manufactures is composed of 55.5% bismuth and 44.5% lead. This ribbon will form discontinuities at 255° F. Another ribbon manufactured by this company is composed of 10% cadmium, 50% bismuth, 26.7% lead and 13.3% tin. This ribbon will form discontinuities at 158° F. Accordingly, a heat-sensitive strip may be selected such that non-conduction occurs at a desired temperature.

Although illustrative embodiments of the present invention have been described herein with reference to the accompanying drawing, it is to be understood that the invention is not limited to those precise embodiments, and that various other changes and modification may be effected therein by one skilled in the art without departing from the scope or spirit of the invention.

What is claimed is:

1. An electrical resistance heating element, which comprises:
   a pair of spaced apart electrical conductors;
   a strip of resistive material disposed between the conductors and extending along the lengths thereof; and
   a strip of heat-sensitive, electrically conductive material disposed between the conductors and extending along the lengths thereof;
   the strips of resistive material and heat-sensitive, electrically conductive material together providing an electrical path transversely between the conductors along the lengths thereof, the heat-sensitive strip permanently interrupting an electrical path between the conductors only over portions of the resistance heating element which attain a predetermined temperature.

2. An electrical resistance heating element, which comprises:
   a pair of spaced apart electrical conductors;
   a strip of resistive material disposed between the conductors and extending along the lengths thereof; and
   a strip of heat-sensitive, electrically conductive material disposed between the conductors and extending along the lengths thereof;
   the strips of resistive material and heat sensitive electrically conductive material together providing an electrical path transversely between the conductors along the lengths thereof, the heat-sensitive, electrically conductive strip interrupting an electrical path between the conductors only over portions of the resistive heating element which attain a predetermined temperature,
   wherein the heat-sensitive, electrically conductive strip is formed from a material such that the heat-sensitive electrically conductive strip shrinks in width at the predetermined temperature, thereby interrupting an electrical path between the conductors and through the resistive material strip only over portions of the resistance element which attains the predetermined temperature.

3. An electrical resistance heating element, which comprises:
   a pair of spaced apart electrical conductors;
   a strip of resistive material disposed between the conductors and extending along the lengths thereof; and
   a strip of heat-sensitive, electrically conductive material disposed between the conductors and extending along the lengths thereof;
   the strips of resistive material and heat-sensitive electrically conductive material together providing an electrical path transversely between the conductors along the lengths thereof, the heat-sensitive electrically conductive strip interrupting an electrical path between the conductors only over portions of the resistance heating element which attain a predetermined temperature,
   wherein the heat-sensitive, electrically conductive strip is formed from a material which forms electrically discontinuous droplets at the predetermined temperature, thereby interrupting an electrical path between the conductors and the resistive material strip only over portions of the resistance element which attain the predetermined temperature.

4. An electrical resistance heating element, which comprises:
   a pair of spaced apart electrical conductors;
   a strip of resistive material disposed between the conductors and extending along the lengths thereof; and
   a strip of heat-sensitive, electrically conductive material disposed between the conductors and extending along the lengths thereof;
   the strips of resistive material and heat-sensitive, electrically conductive material together providing an electrical path transversely between the conductors along the lengths thereof, the heat-sensitive electrically conductive strip interrupting an electrical path between the conductors only over portions of the resistance heating element which attain a predetermined temperature,
   wherein the strip of resistive material is formed from magnetic recording tape.

5. An electrical resistance heating element comprising:
   first and second electrical conductors in spaced relationship from each other, said first and second conductors including opposite inner edges and outer edges, said inner edges of said first and second conductors being separated to define a conductor gap having a given conductor gap width;
   first and second resistive heating portions disposed between the conductors and extending along the lengths thereof, each of the first and second resistive heating portions including opposite inner and outer edges, said inner edges of said first and second resistive heating portions defining a gap having a given resistive portion gap width, said first resistive heating portion being electrically coupled to said first electrical conductor along the length thereof, and said second resistive heating portion being electrically coupled to said second electrical conductor along the length thereof; and
   a heat-sensitive, electrically conductive portion having opposite first and second edges and having at least said given resistive portion gap width so that said opposite first and second edges of said heat-sensitive portion electrically communicate with said inner edges of said first and second resistive heating portions;
   said heat-sensitive, electrically conductive portion having a first width at a first, normal operating temperature of the resistance heating element and a second, narrower width at a second, abnormal higher temperature;
   said heat-sensitive portion being in substantial electrical communication with said first and second resistive heating portions when said heat-sensitive portion has said first width and the electrical resistance element is operating at the first, normal operating temperature, thereby allowing current to flow widthwise through said first and second resistive heating portions;

said heat-sensitive portion being in substantial non-electrical communication with at least one of said first and second resistive heating portions only over portions of the length thereof where said heat-sensitive portion has said second width and the electrical resistance element is operating at the second, abnormal higher temperature, thereby disrupting the flow of current through said first and second resistive heating portions only over portions of the length of the heat-sensitive portion having the second width.

6. An electrical resistance element as defined by claim 5, wherein each the first and second resistive heating portions is formed from magnetic recording tape.

7. An electrical resistance element as defined by claim 5, which further comprises first and second non-conductive coverings, wherein said first and second electrical conductors, said first and second resistive heating portions, and said heat-sensitive portion are positioned between said first and second non-conductive coverings.

8. An electrical resistance element as defined by claim 7, wherein said first and second non-conductive coverings are laminated together.

9. An electrical resistance heating element comprising:

first and second electrical conductors in spaced relationship from each other, said first and second conductors including opposite inner edges and outer edges, said inner edges of said first and second conductors being separated to define a conductor gap having a given conductor gap width;

a resistive heating portion disposed between the conductors and extending along the lengths thereof, the resistive heating portion including opposite first and second edges, said first edge being in electrical communication with said first electrical conductor and along the length thereof; and a heat-sensitive, electrically conductive portion disposed between the conductors and extending along the lengths thereof, the heat-sensitive portion having opposite first and second edges, said first edge of said heat-sensitive, electrically conductive portion being in electrical communication with said second edge of said resistive heating portion along the length thereof and said second edge of said heat-sensitive, electrically conductive portion being in electrical communication with said inner edge of said second electrical conductor along the length thereof;

said heat-sensitive, electrically conductive portion having a first width at a first, normal operating temperature and a second, narrower width at a second, abnormal higher temperature;

said heat-sensitive portion being in electrical communication with said resistive heating portion and said inner edge of said second conductor when said heat-sensitive portion has said first width and the electrical resistance element is operating at the first, normal operating temperature, thereby allowing current to flow through said resistive heating portion;

said heat-sensitive portion being in nonelectrical communication with at least one of said resistive heating portion and said inner edge of said second conductor only over portions of the length thereof where said heat-sensitive portion has said second width and the electrical resistance element is operating at the second, abnormal higher temperature, thereby disrupting the flow of current through said resistive heating portion only over portions of the length of the heat-sensitive portion having the second width.

10. An electrical resistance element as defined by claim 9, wherein the resistive heating portion is formed from magnetic recording tape.

11. An electrical resistance element as defined by claim 9, which further comprises first and second non-conductive coverings, wherein said first and second electrical conductors, said resistive heating portion, and said heat-sensitive portions are positioned between said first and second non-conductive coverings.

12. An electrical resistance heating element comprising:

first and second electrical conductors in spaced relationship from each other, said first and second conductors including opposite inner edges and outer edges, said inner edges of said first and second conductors being separated to define a conductor gap having a given conductor gap width;

at least one resistive heating portion disposed between the conductors and extending along the lengths thereof, the resistive heating portion including opposite edges, at least one of said edges of said resistive heating portion being in electrical communication with at least one of said electrical conductors along the length thereof; and a heat-sensitive, electrically conductive portion having opposite first and second edges, at least one of said edges of the heat-sensitive portion being in substantial electrical communication with said resistive heating portion along the length thereof and with at least one of said electrical conductors along the length thereof, thereby allowing current to flow widthwise through said electrical conductors, said resistive heating portion and said heat-sensitive, electrically conductive portion;

said heat-sensitive electrically conductive portion substantially permanently interrupting the flow of current widthwise through the resistive heating portion only over portions thereof which attain a predetermined temperature.

13. An electrical resistance heating element, which comprises:

first and second electrical conductors in spaced relationship from each other, the first and second conductors including opposite inner edges and outer edges, the inner edges of the first and second conductors being separated to define a conductor gap having a given conductor gap width;

first and second resistive heating portions disposed between the conductors and extending along the lengths thereof, the first and second resistive heating portions including opposite inner and outer edges, said inner edges of said first and second resistive heating portions defining a gap having a given resistive portion gap width, said first resistive heating portion being electrically coupled to said first electrical conductor along the length thereof, and said second resistive heating portion being electrically coupled to said second electrical conductor along the length thereof; and a heat-sensitive, electrically conductive portion having opposite first and second edges and having a width which is at least equal to said given resistive portion gap width so that said opposite first and second edges of said heat-sensitive portion electrically communicate with said inner edges of said first and second resistive heating portions along the lengths thereof;

said heat-sensitive, electrically conductive portion having a conductive material which forms an electrical discontinuity transversely across the heat-sensitive portion at a predetermined temperature, thereby permanently interrupting the flow of current widthwise through the resistive heating portions only over portions thereof which attain the predetermined temperature.

14. An electrical resistance heating element, which comprises:

first and second electrical conductors in spaced relationship from each other, said first and second conductors including opposite inner edges and outer edges, said inner edges of said first and second conductors being separated to define a conductor gap having a given conductor gap width;

a resistive heating portion disposed between the conductors and extending along the lengths thereof, the resistive heating portion including opposite first and second edges, said first edge being in electrical communication with said first electrical conductor along the length thereof; and a heat-sensitive, electrically conductive portion having opposite first and second edges, said first edge of said heat-sensitive, electrically conductive portion being in electrical communication with said second edge of said resistive heating portion along the length thereof, and said second edge of said heat-sensitive, electrically conductive material being in electrical communication with said inner edge of said second electrical conductor along the length thereof;

said heat-sensitive, electrically conductive portion having a conductive material which forms an electrical discontinuity transversely across the heat-sensitive portion at a predetermined temperature, thereby permanently interrupting the flow of current widthwise through the resistive heating portion only over portions thereof which attain the predetermined temperature.

15. An area heater, which comprises:

an arrangement of parallel electrical resistance heating elements, each of the electrical resistance elements including:

a pair of spaced apart electrical conductors;

a strip of resistive material disposed between the conductors and extending along the lengths thereof; and a strip of heat-sensitive, electrically conductive material disposed between the conductors and extending along the lengths thereof;

corresponding electrical conductors of each electrical resistance heating elements of the arrangement being electrically connected together;

the strips of resistive material and heat sensitive, electrically conductive material of each electrical resistance heating element of the arrangement together providing an electrical path between the conductors of each resistance element along the length thereof, the heat-sensitive strips of each electrical resistance heating element of the arrangement permanently interrupting the flow of current widthwise through the resistive material strip of the corresponding heating element only over portions thereof which attain a predetermined temperature;

the arrangement of parallel electrical resistance heating elements defining a planar surface from which heat is radiated.

* * * * *